US012109818B2

(12) United States Patent
Tsutsumi et al.

(10) Patent No.: US 12,109,818 B2
(45) Date of Patent: Oct. 8, 2024

(54) RECORDING APPARATUS AND WIPING METHOD

(71) Applicant: CANON KABUSHIKI KAISHA, Tokyo (JP)

(72) Inventors: Hiromasa Tsutsumi, Kanagawa (JP); Hideaki Matsumura, Tokyo (JP); Shimpei Fujisaki, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/893,040

(22) Filed: Aug. 22, 2022

(65) Prior Publication Data

US 2023/0060809 A1 Mar. 2, 2023

(30) Foreign Application Priority Data

Aug. 30, 2021 (JP) ................................ 2021-140199

(51) Int. Cl.
*B41J 2/165* (2006.01)

(52) U.S. Cl.
CPC ....... *B41J 2/16538* (2013.01); *B41J 2/16535* (2013.01); *B41J 2/16547* (2013.01)

(58) Field of Classification Search
CPC . B41J 2/16538; B41J 2/16535; B41J 2/16547
See application file for complete search history.

(56) References Cited

U.S. PATENT DOCUMENTS 7,766,450 B2 * 8/2010 Nishizaki ............ B41J 2/16508 347/29

FOREIGN PATENT DOCUMENTS

| | | | |
|---|---|---|---|
| JP | H07205438 | A | 8/1995 |
| JP | 2005041192 | A | 2/2005 |
| JP | 2013144460 | A | 7/2013 |
| JP | 2014172238 | A | 9/2014 |
| JP | 2015020407 | A | 2/2015 |

* cited by examiner

*Primary Examiner* — Geoffrey S Mruk
(74) *Attorney, Agent, or Firm* — Canon U.S.A., Inc. IP Division

(57) ABSTRACT

A recording apparatus includes a wiper, a recording head having a step portion and an ejection port surface supporting an ejection port, and a moving unit to relatively move the wiper and the recording head so that the wiper moves with respect to the recording head in relative movement in a first direction. In a first wiping, the relative movement causes the wiper to stop at or in vicinity of the step portion, or pass at or in the vicinity of the step portion at a speed lower than a speed at which the wiper wipes an area in which the ejection port is arranged. In a second wiping performed after the first wiping, the relative movement causes the wiper to pass through the step portion of the recording head and wipe the recording head in the first direction toward the area, and thereafter wipe the area.

10 Claims, 12 Drawing Sheets

RECORDING APPARATUS AND WIPING METHOD

BACKGROUND

Field

The present disclosure relates to a recording apparatus and a wiping method.

Description of the Related Art

Known is an ink-jet recording apparatus that wipes an ejection port surface using a blade for wiping the ejection port surface to maintain an ejection state of ink from an ejection port.

Japanese Patent Application Laid-Open No. 2013-144460 discusses an ink-jet recording apparatus provided with a wiping mechanism having a plurality of blades that is arranged side by side and that is different in rigidity. In this configuration, using the blades that are different in rigidity depending on a wipe direction enables prevention of re-adherence of a sticking substance on a blade to a nozzle.

However, the configuration discussed in Japanese Patent Application Laid-Open No. 2013-144460 requires arrangement of the plurality of blades that is different in rigidity, and becomes complicated. Depending on a configuration of a recording head, there may be a step portion in an area in which an ejection port is not formed on an ejection port surface. In such a configuration, ink may be accumulated in the step portion in some cases. Ink accumulated in the step portion is extracted by a blade coming into contact with the step portion at the time of wiping, and there is a possibility that adherence of ink to the vicinity of the ejection port occurs and causes defective ejection.

SUMMARY

The present disclosure is directed to prevention of adherence of ink accumulated in a step portion on an ejection port surface of a recording head to the vicinity of an ejection port at the time of wiping.

According to an aspect of the present disclosure, a recording apparatus includes a recording head having an ejection port surface and a step portion, wherein an ejection port configured to eject ink is arranged on the ejection port surface and the step portion (i) is at a position different from an area in which the ejection port is arranged on the ejection port surface side and (ii) is formed of at least one of a raised portion that is raised with respect to the ejection port surface or a recessed portion that is recessed with respect to the ejection port surface, a wiper configured to wipe the ejection port surface, and a moving unit configured to relatively move the wiper and the recording head so that the wiper moves with respect to the recording head in a first direction along the ejection port surface, wherein, in a first wiping, the relative movement of the wiper and the recording head by the moving unit causes the wiper to stop at or in vicinity of the step portion, or pass at or in the vicinity of the step portion at a speed lower than a speed at which the wiper wipes the area in which the ejection port is arranged, and wherein, in a second wiping performed after the first wiping, the relative movement of the wiper and the recording head by the moving unit causes the wiper to pass through the step portion of the recording head and wipe the recording head in the first direction toward the area in which the ejection port is arranged, and thereafter wipe the area in which the ejection port is arranged.

Further features of the present disclosure will become apparent from the following description of exemplary embodiments with reference to the attached drawings.

DESCRIPTION OF THE EMBODIMENTS

Exemplary embodiments of the present disclosure will be described specifically below with reference to drawings.

A first exemplary embodiment of the present disclosure will now be described specifically with reference to the drawings. An identical reference sign represents an identical part or a corresponding part throughout the drawings.

Description about Overview of Ink-Jet Recording Apparatus

Figure 1:
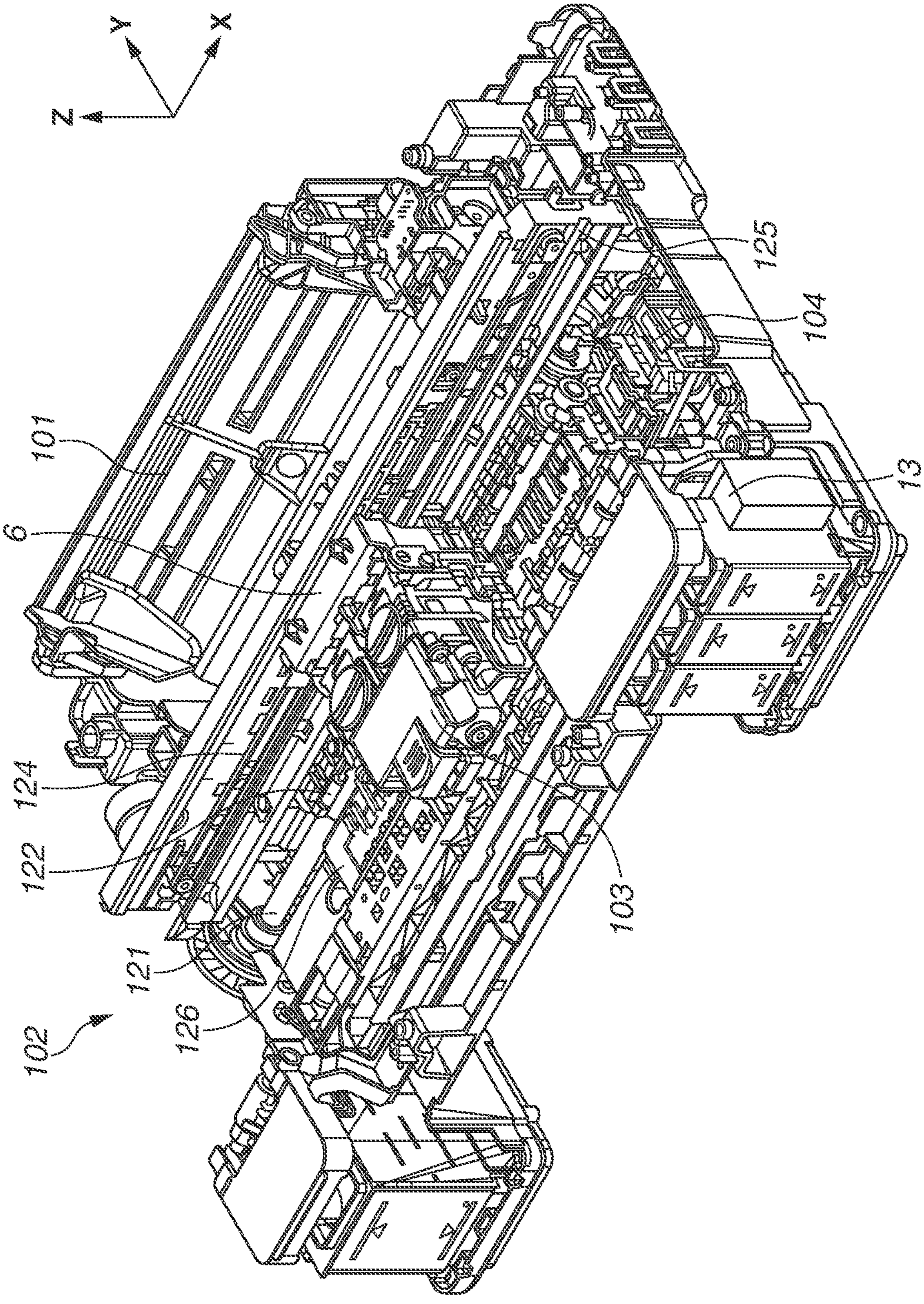
FIG. 1 is a perspective view illustrating an internal configuration of an ink-jet recording apparatus according to a first exemplary embodiment.

FIG. 1 is a perspective view illustrating an internal configuration of an ink-jet recording apparatus 1 according to the present exemplary embodiment.

As illustrated in FIG. 1, the ink-jet recording apparatus (hereinafter also simply referred to as a recording apparatus) 1 includes a paper feed unit 101, a conveyance unit 102, a recording mechanism unit 103, and a recovery mechanism unit 104. The paper feed unit 101 feeds a recording material P such as recording paper to the inside of a main body of the recording apparatus 1. The conveyance unit 102 conveys the recording material P fed by the paper feed unit 101 in a negative Y-direction. The recording mechanism unit 103 operates based on image information, and records an image on the recording material P. The recovery mechanism unit

104 is a unit for maintaining or recovering ink ejecting performance of a recording head.

The recording material P loaded on the paper feed unit 101 is separated one sheet by one sheet by a paper feed roller driven by a paper feed/conveyance motor 205 to be sent out, and then fed to the conveyance unit 102. The recording material P fed to the conveyance unit 102 is conveyed onto a platen 126 while being pinched by a conveyance roller 121 and a pinch roller 122 that are driven by the paper feed/conveyance motor 205.

The recording material P conveyed onto the platen 126 is subjected to recording by the recording mechanism unit 103. The recording mechanism unit 103 drives, based on image information, a carriage 6 on which a recording head 5 (refer to FIG. 3) is mounted and that moves in a main scanning direction (X-direction), ejects ink from an ejection port of the recording head 5, and thereby performs recording. The recording material P subjected to recording is pinched by a paper discharge roller and a driven roller that are driven in synchronization with the conveyance roller 121, and thereby discharged to the outside of an apparatus main body.

The recording mechanism unit 103 includes the carriage 6 capable of reciprocally moving in the main scanning direction, and a recording cartridge mounted on the carriage 6. The carriage 6 is guided and supported so as to be capable of reciprocally moving along a guide rail arranged in the apparatus main body. The reciprocal movement of the carriage 6 is driven by a carriage motor 204 via a carriage belt 124. The reciprocal movement of the carriage 6 is controlled by an encoder sensor mounted on the carriage 6 and an encoder scale 125 stretched on the apparatus main body side detecting a position and speed of the carriage 6. An image for an entire recording material P is recorded by repetition of the following operation. An image for one-time scanning is recorded by recording operation of the recording head 5 in synchronization with the movement (main scanning) of the carriage 6, and the recording material P is conveyed by a predetermined pitch (sub-scanning is performed) after completion of the recording for one-time scanning.

The recovery mechanism unit 104 is arranged to eliminate clogging or the like in the ejection port of the recording head 5 and thereby maintain or recover quality of an image to be recorded to a normal state. The recovery mechanism unit 104 includes a wiping mechanism for wiping the ejection port surface, a capping mechanism for covering the ejection port surface, and a pump mechanism for sucking ink from the ejection port. The recovery mechanism unit 104 according to the present exemplary embodiment includes a slider 7 that is movable within a predetermined range following the movement of the carriage 6 when the carriage 6 moves toward the recovery mechanism unit 104. This will be described below with reference to FIG. 4. The slider 7 comes with wipers (blades in the present exemplary embodiment) 8 and 9 of the wiping mechanism and caps 1A and 1B of the capping mechanism. The caps 1A and 1B cover the ejection port surfaces, and can thereby prevent evaporation of moisture content of ink from the ejection ports and an increase in viscosity of ink.

Description about Block Diagram

Figure 2:
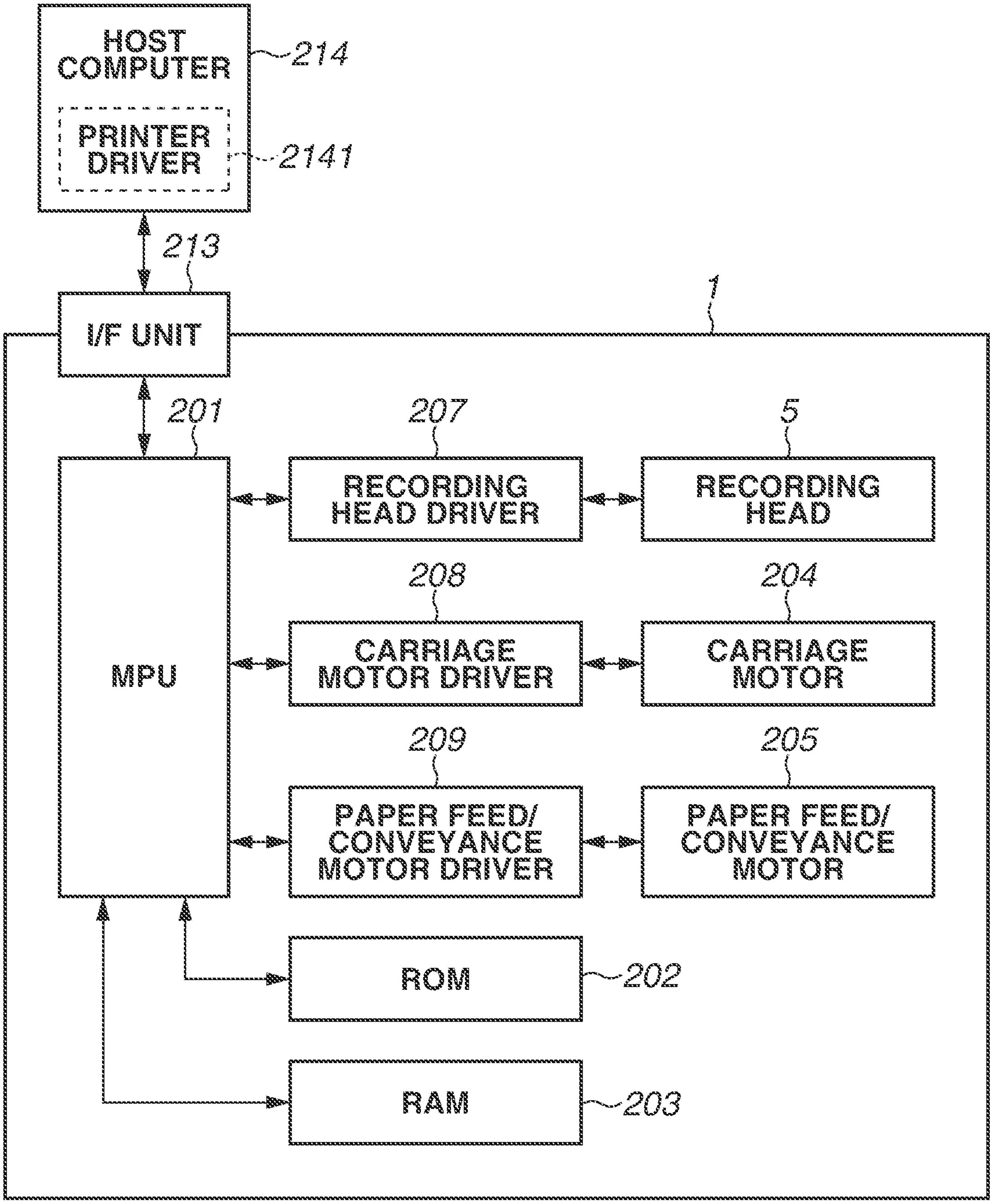
FIG. 2 is a block diagram illustrating the ink-jet recording apparatus according to the first exemplary embodiment.

FIG. 2 is a block diagram illustrating the ink-jet recording apparatus 1 according to the present exemplary embodiment. As illustrated in FIG. 2, a microprocessing unit (MPU) 201 controls operation of each unit of the recording apparatus 1, processing of data, and the like. A read-only memory (ROM) 202 stores a program and data executed by the MPU 201. A random-access memory (RAM) 203 temporarily stores processing data executed by the MPU 201 or data received from a host computer 214.

The recording head 5 is controlled by a recording head driver 207. The carriage motor 204 that drives the carriage 6 is controlled by a carriage motor driver 208. A paper feed roller 120, the conveyance roller 121, the paper discharge roller driven in synchronization with the conveyance roller 121 are driven by the paper feed/conveyance motor 205. The paper feed/conveyance motor 205 is controlled by a paper feed/conveyance motor driver 209.

The host computer 214 is provided with a printer driver 2141 for communicating recording information such as a recorded image and quality of the recorded image with the recording apparatus 1 when execution of recording operation is instructed by a user. The MPU 201 communicates the recorded image or the like with the host computer 214 via an interface (I/F) unit 213.

Detailed Description of Recording Mechanism Unit 103

Figure 3:
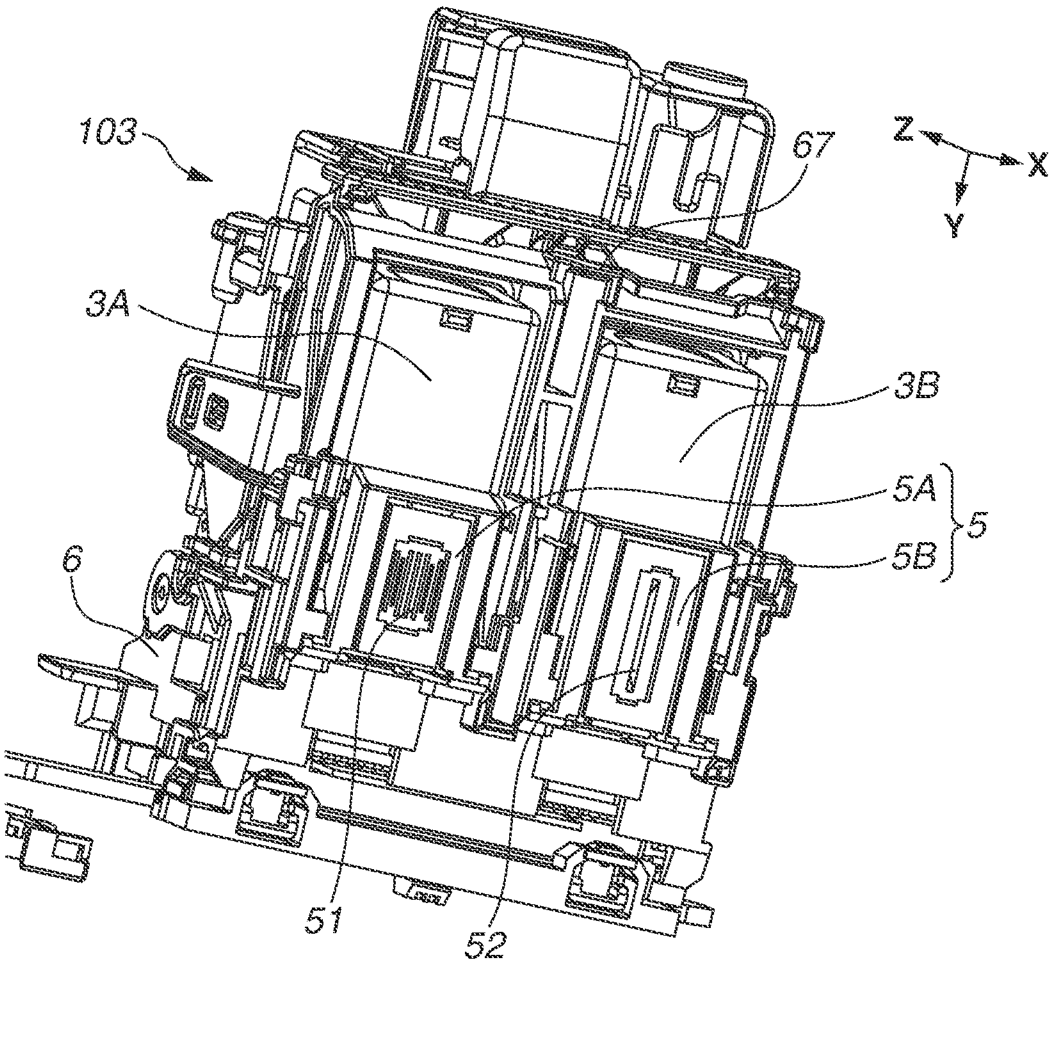
FIG. 3 is a perspective view illustrating a recording mechanism unit according to the first exemplary embodiment.

FIG. 3 is a perspective view illustrating the recording mechanism unit 103 according to the present exemplary embodiment. As illustrated in FIG. 3, two recording cartridges 3A and 3B are detachably mounted on the carriage 6. The recording cartridge 3A is composed of an ink cartridge in which a recording head 5A and an ink tank are integrated. The recording cartridge 3B is composed of an ink cartridge in which a recording head 5B and an ink tank are integrated. The recording cartridge 3A for colors is provided with the recording head 5A that performs recording using ink in a plurality of colors. The recording cartridge 3B for a single color is provided with the recording head 5B that performs recording using ink in a single color (for example, black). For example, ejection port arrays that eject ink in respective three colors of cyan, magenta, and yellow are formed on an ejection port surface 51 of the recording head 5A. An ejection port array that ejects ink in the single color such as black is formed on an ejection port surface 52 of the recording head 5B.

A configuration of the ejection port arrays of the recording head 5 is not limited thereto. For example, a plurality of ejection port arrays that ejects ink in different colors may be formed also in the recording head 5B. In addition, a configuration in which the recording head 5 and the ink tank are formed separately may be employed, instead of an ink cartridge method.

Detailed Description of Recovery Mechanism Unit 104

Figure 4:
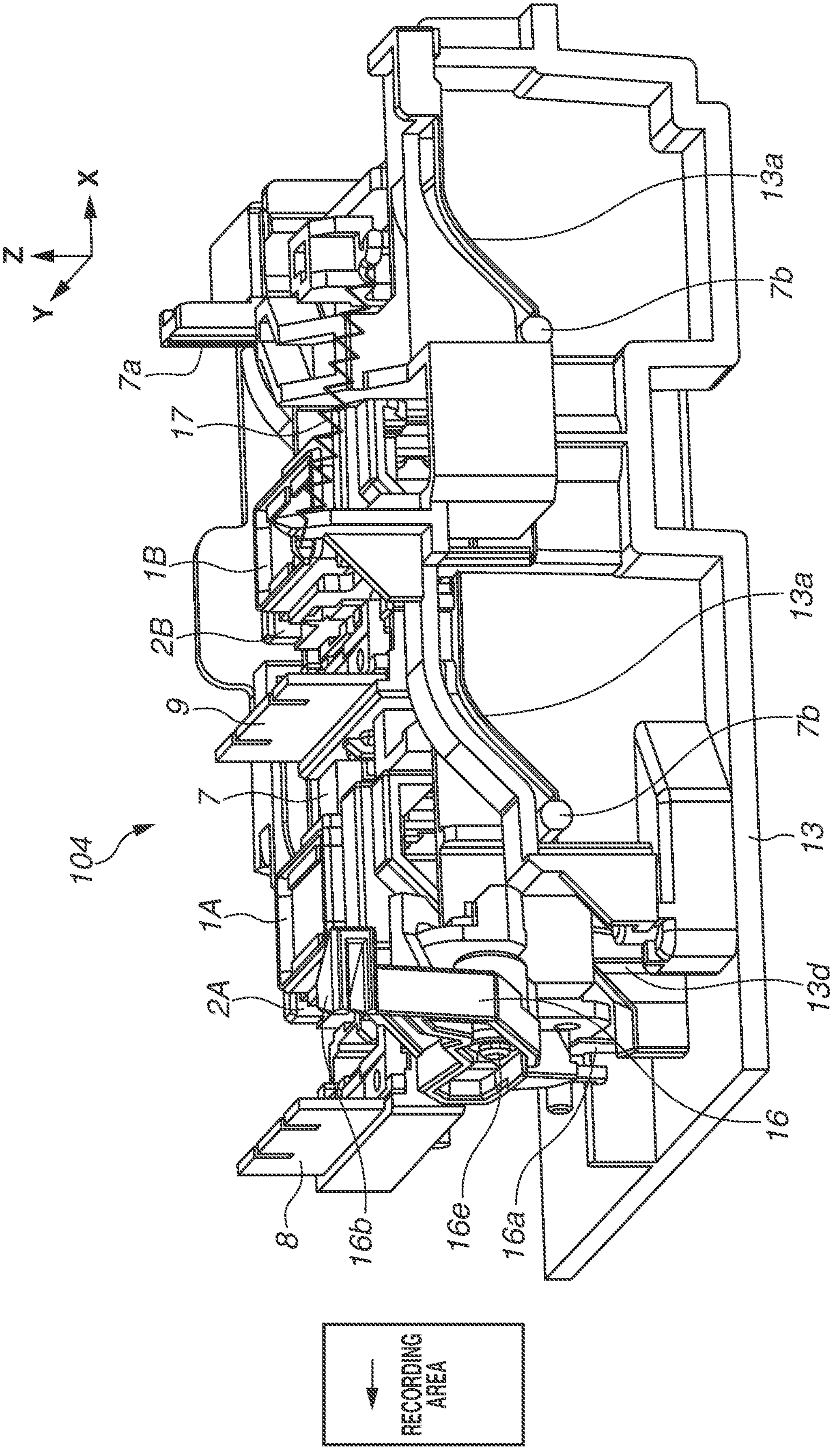
FIG. 4 is a perspective view illustrating a recovery mechanism unit according to the first exemplary embodiment.

FIG. 4 is a perspective view illustrating the recovery mechanism unit 104 according to the present exemplary embodiment. As illustrated in FIG. 4, the slider 7 is provided with a stopper portion 7*a* that comes into contact with a side surface of the carriage 6 to move within the predetermined range following the movement of the carriage 6. The slider 7 is urged in a negative X-direction by a slider spring 17. This configuration allows the slider 7 to move from an evacuating position at which the blades 8 and 9 and the caps 1A and 1B are separated from the respective recording heads 5A and 5B, to a wiping position at which the blades 8 and 9 can wipe the ejection port surfaces 51 and 52 of the respective recording heads 5A and 5B. The configuration also allows the slider 7 to move to a capping position at which the ejection port surfaces 51 and 52 of the respective recording heads 5A and 5B can be covered by the caps 1A and 1B, respectively. A total of four protruding portions 7*b* that protrude from respective side surfaces of the slider 7 in the Y-direction crossing (orthogonal to, in this case) a moving direction of the carriage 6 are arranged. FIG. 4 illustrates two protruding portions 7*b* arranged in the negative Y-direction. The remaining two protruding portions 7*b* are arranged in a positive Y-direction. The four protruding portions 7*b* are in contact with respective slider cams 13*a* arranged in a main body bottom case 13. The slider 7 is moved by the four protruding portions 7*b* sliding along cam surfaces of the respective slider cams 13*a* arranged in the main body bottom case 13. With the sliding, the slider 7 is controlled to have a predetermined height with respect to the ejection port surfaces 51 and 52 at each position (evacuating position, wiping position, capping position, and the like) along the moving direction of the carriage 6.

The blade 8 for wiping the ejection port surface 51 of the recording head 5A for colors and the blade 9 for wiping the ejection port surface 52 of the recording head 5B for black are attached to the slider 7. The caps 1A and 1B for capping the ejection port surfaces 51 and 52, respectively, are attached to cap holders 2A and 2B, respectively. Each of the cap holders 2A and 2B is attached to the slider 7 with four claw portions. A cap spring is arranged between each of the cap holders 2A and 2B and the slider 7, and the cap holders 2A and 2B to which the caps 1A and 1B are attached, respectively, are urged in a positive Z-direction toward the ejection port surfaces 51 and 52, respectively. The blade 8, the cap 1A, the blade 9, and the cap 1B are arranged in this order from a recording area side toward the positive X-direction.

Figure 5:
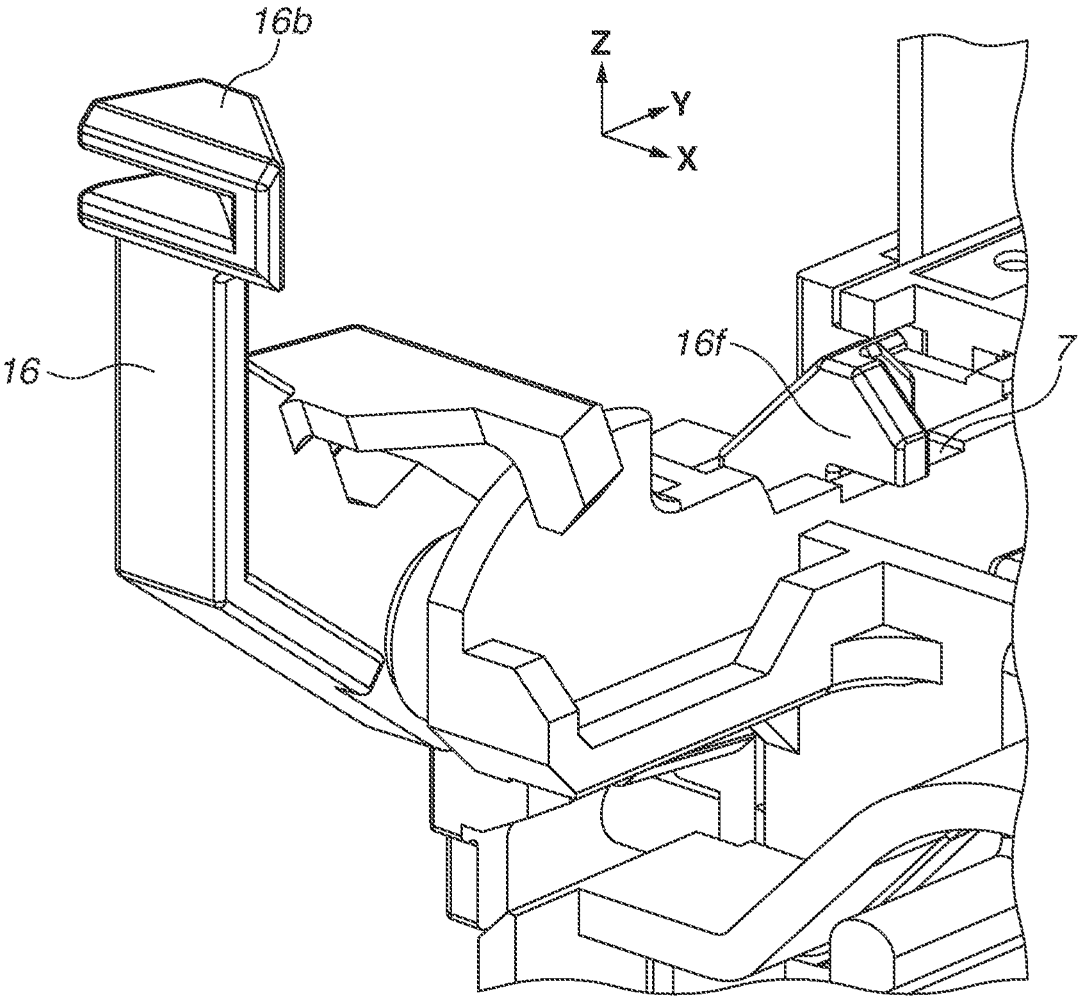
FIG. 5 is a perspective view illustrating a position of a lock lever according to the first exemplary embodiment.

As illustrated in FIG. 4, a lock lever 16, as a locking portion that operates to lock the slider 7 at the wiping position, is attached to a portion on the slider 7 on the downstream side in the conveyance direction (negative Y-direction) at the end of the recording area. The lock lever 16 is attached so as to be rotationally movable to a locking position to lock the slider 7 at the wiping position and to a release position to release a locking state of the slider 7. When the carriage 6 moves to the wiping position to wipe the ejection port surfaces 51 or 52 of the respective recording heads 5A and 5B, the lock lever 16 prevents the slider 7 from moving to a −X-side and a −Z-side, and operates to restrict the movement of the slider 7. The lock lever 16 is supported so as to be rotationally movable within a plane in the Y-direction crossing (orthogonal to, in this case) the moving direction of the carriage 6. The lock lever 16 includes a supporting shaft 16*e*, and is supported so as to be rotationally movable about the supporting shaft 16*e*. Furthermore, with action of urging force of a torsion coil spring that is not illustrated and that urges the lock lever 16 so as to rotate the lock lever 16 in a counter-clockwise direction, the lock lever 16 is held at a position to which the lock lever 16 is moved by the urging force of the torsion coil spring unless external torque of a predetermined value or more acts. The position mentioned herein is a position in a state where a protruding portion 16*f* of the lock lever 16 is in contact with the slider 7 (refer to FIG. 5).

FIGS. 6A, 6B, 7A, and 7B are front views each illustrating the recovery mechanism unit 104 in a state where the slider 7 is at each position. On the apparatus main body side, arranged is a locking portion 13*d* capable of locking a leading end surface 16*a* of the lock lever 16 when the lock lever 16 is in a state where the protruding portion 16*f* and the slider 7 come into contact with each other.

Figure 6A:
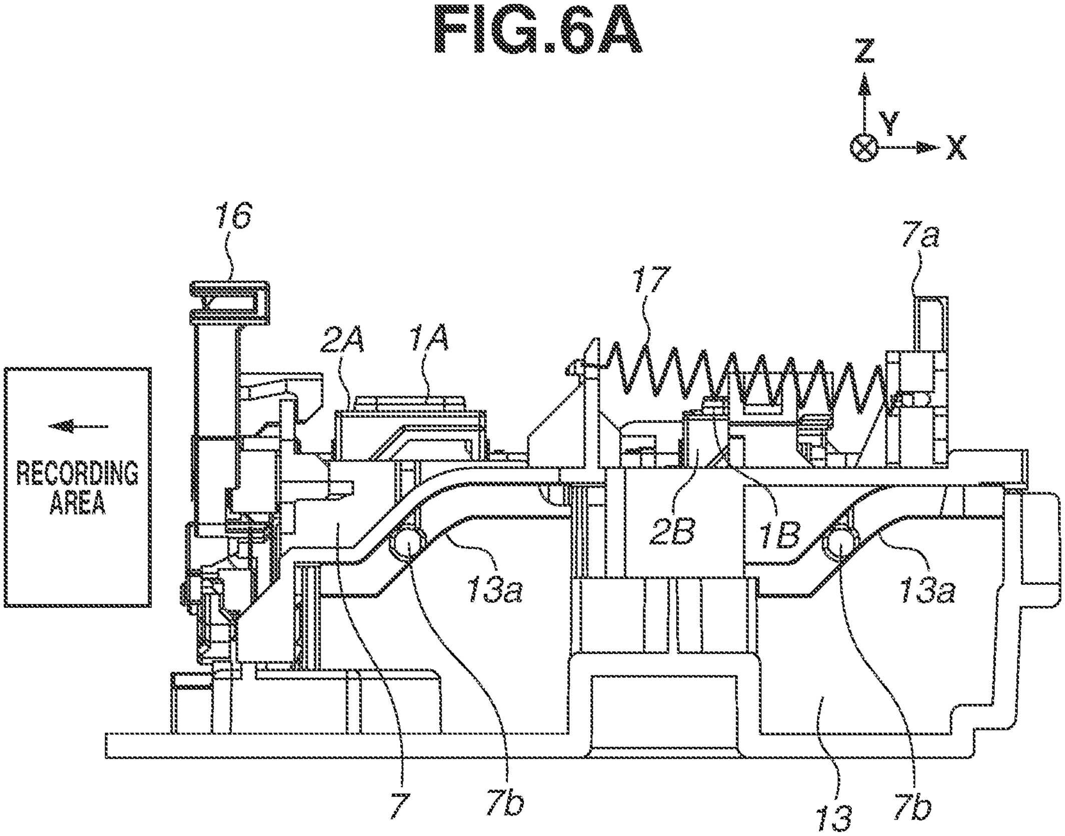
FIGS. 6A and 6B are diagrams each illustrating the recovery mechanism unit with respect to a position of a slider according to the first exemplary embodiment.
Figure 6B:
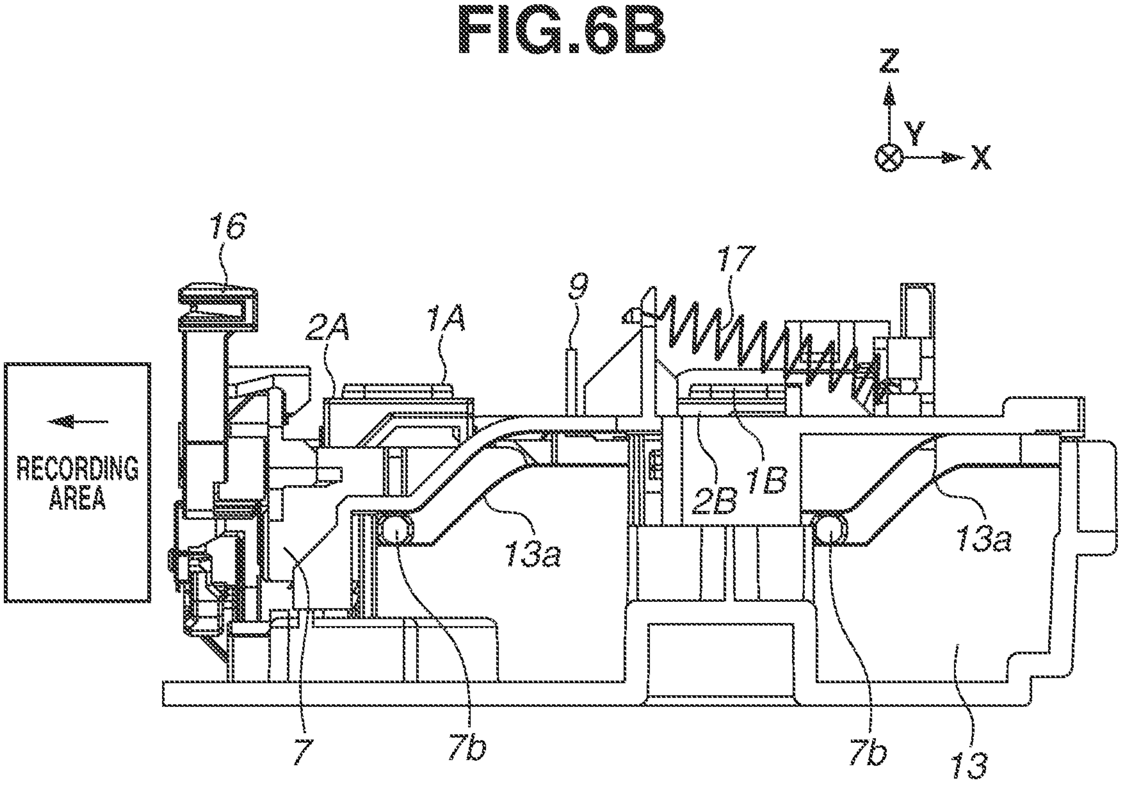

FIG. 6A illustrates a state of the recovery mechanism unit 104 at the time of wiping. First, the carriage 6 moves from the recording area toward the positive X-direction, comes into contact with the stopper portion 7*a* to move the stopper portion 7*a* in the positive X-direction, and thereby moves the blades 8 and 9 in the positive X-direction. The leading end surface 16*a* of the lock lever 16 is locked by the locking portion 13*d* at a position illustrated in FIG. 6A, and the positions of the blades 8 and 9 are fixed. With the movement of the carriage 6 toward the recording area in this state, the blades 8 and 9 wipe the ejection port surfaces 51 and 52, respectively, while moving with respect to the carriage 6 in the direction in which the respective ejection port surfaces 51 and 52 are formed (X-direction), whereby wiping operation is performed.

The carriage 6 moves to the recording area side during the wiping operation. The carriage 6 is provided with a protruding portion for unlocking 67 that is capable of coming into contact with an upper end portion 16*b* of the lock lever 16 (refer to FIG. 3). The protruding portion for unlocking 67 comes into contact with the upper end portion 16*b* of the lock lever 16 when the carriage 6 moves toward the recording area, and thereby rotationally moves the lock lever 16 in a clockwise direction when seen from the recording area side. With this operation, the leading end surface 16*a* of the lock lever 16 is separated from the locking portion 13*d*, the locking state of the lock lever 16 is released, and the recovery mechanism unit 104 comes into a state illustrated in FIG. 6B. Since the recovery mechanism unit 104 comes into the state where the blades 8 and 9 move in a −Z-direction and are not in contact with the carriage 6 nor the respective recording heads 5, the carriage 6 becomes movable to the recording area and comes into a state of being able to perform recording.

Figure 7A:
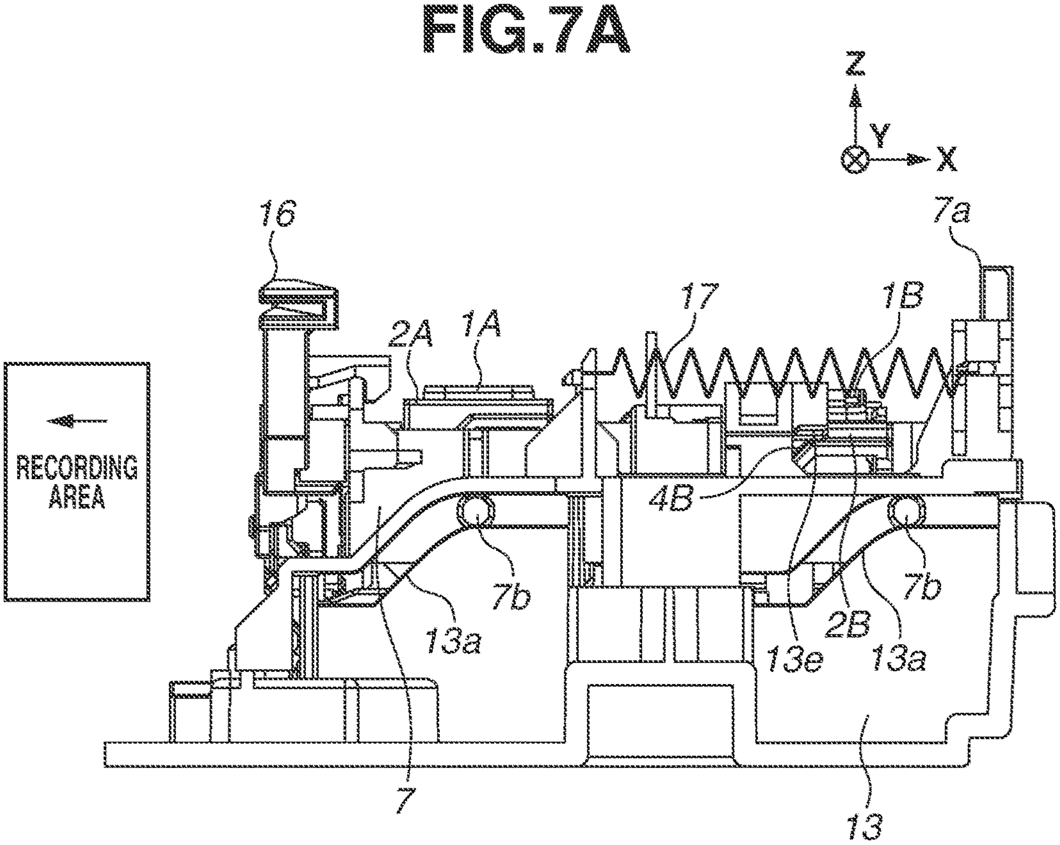
FIGS. 7A and 7B are diagrams each illustrating the recovery mechanism unit with respect to a position of the slider according to the first exemplary embodiment.

FIG. 7A illustrates a stand-alone suction position. The cap holder 2B is provided with a cap holder cam portion 4B in a portion of the cap holder 2B on the downstream side in the conveyance direction. In addition, on the apparatus main body side, arranged is a cam portion 13*e* that comes into contact with the cap holder cam portion 4B in a state where the slider 7 is at the stand-alone suction position. With this configuration, in the state where the slider 7 is at the stand-alone suction position, the cap holder cam portion 4B and the cam portion 13*e* come into contact with each other and the cap holder 2B is thereby pushed downward. Accordingly, the cap 1B attached to the cap holder 2B is also pushed downward.

As a result, capping of the cap 1B is released, and only the cap 1A is caused to cap the ejection port surface 51. Driving the pump mechanism, which is not illustrated, at the stand-alone suction position enables suction of ink from the ejection port on the ejection port surface 51 capped by the cap 1A.

Figure 7B:
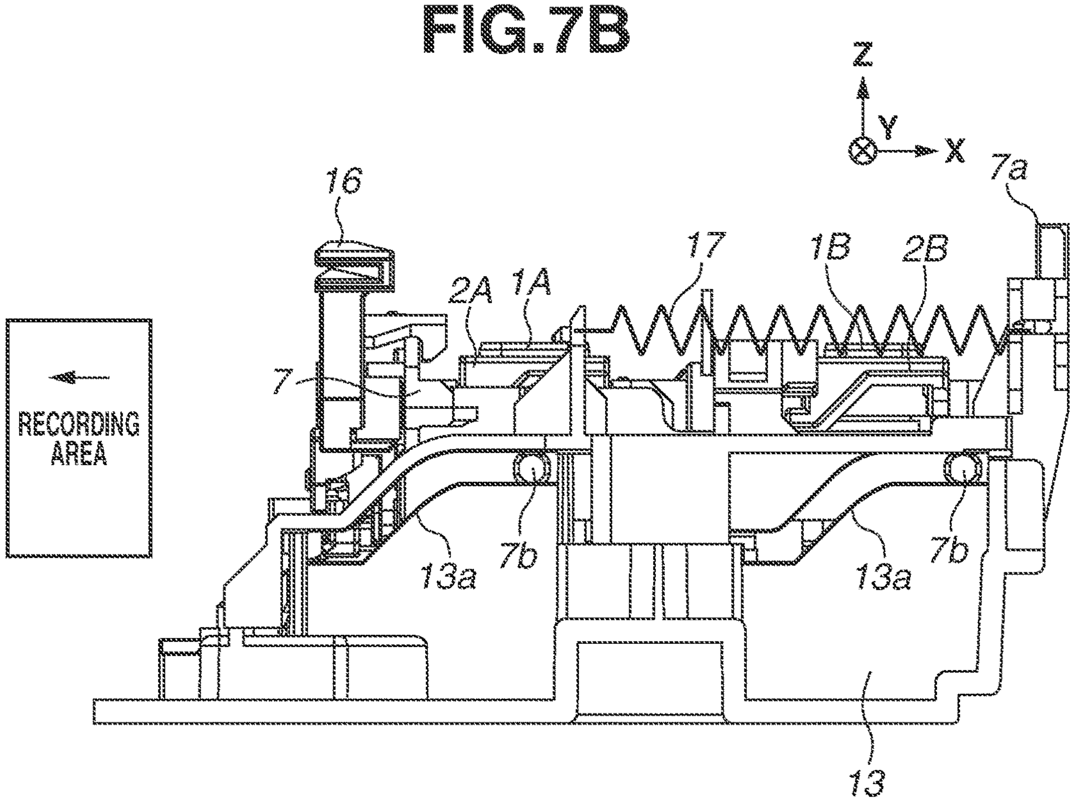

FIG. 7B illustrates a position at which the caps 1A and 1B can simultaneously cap the ejection port surfaces 51 and 52, respectively. Driving the pump mechanism at a simultaneous capping position enables suction of ink from the ejection port on the ejection port surface 51 capped by the cap 1A and ink from the ejection port on the ejection port surface 52 capped by the cap 1B.

Detailed Description of Recording Head 5

Figure 8:
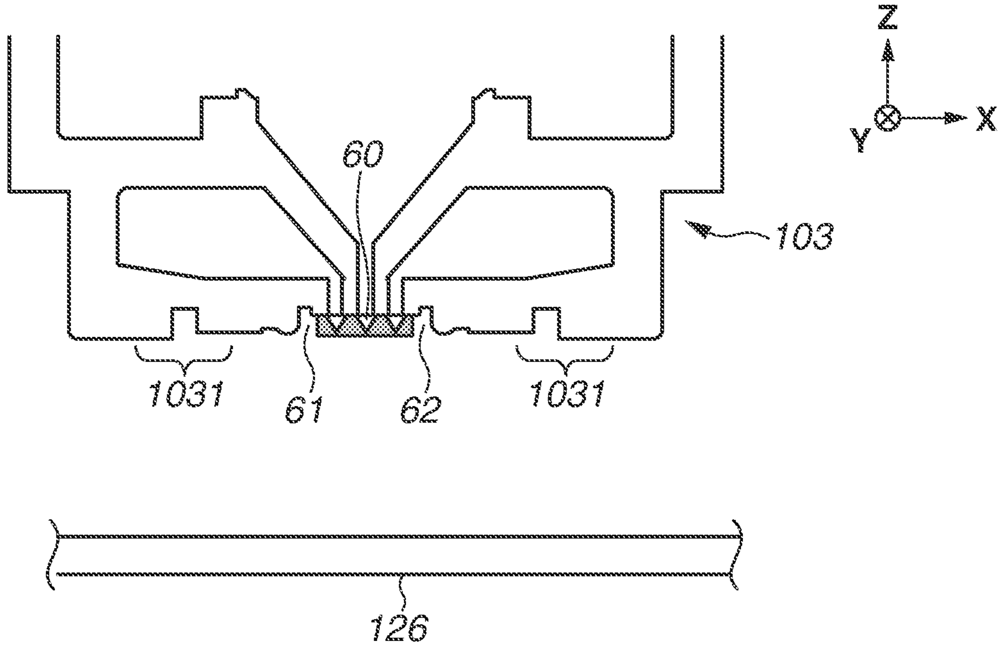
FIG. 8 is a sectional view illustrating a recording head according to the first exemplary embodiment.

FIG. 8 is a sectional view illustrating the recording head 5A. The recording head 5A includes a platen facing surface 1031 that faces the platen 126. In the present exemplary embodiment, the platen facing surface 1031 includes the ejection port surface 51, and is a wiped surface that is wiped by a blade in a wiping sequence, which will be described below. A plurality of ejection ports 60 is arranged at a central portion of the ejection port surface 51 of the recording head 5A, and an ejection port array is formed of the plurality of ejection ports 60 in the Y-direction. A first recessed portion 61 and a second recessed portion 62 are arranged as step portions on the ejection port surface side of the ejection port surface 51 so as to interpose the ejection ports 60 therebetween. The first recessed portion 61 and the second recessed portion 62 are recessed with respect to the ejection port surface 51 in an opposite direction (+Z-direction) of a direction in which ink is ejected from the ejection ports 60. The first recessed portion 61 and the second recessed portion 62 are formed during a manufacturing process of the recording head 5. To attach a chip provided with the ejection ports 60 to the recording head 5A, the recording head 5A is provided with a recessed portion that is larger than the chip. Hence, a gap is formed when the chip is attached, and this gap serves as each of the first recessed portion 61 and the second recessed portion 62. Since there is a possibility for entry of ink into the first recessed portion 61 and the second recessed portion 62 due to suction operation or the like, the first recessed portion 61 and the second recessed portion 62 are preferably small.

Similarly to the recording head 5A, the recording head 5B includes a platen facing surface 1032 that faces the platen 126.

The ejection port surface 52 of the recording head 5B similarly includes a first recessed portion 63 and a second recessed portion 64 in the X-direction with respect to the ejection ports.

Detailed Description of Wiping

Figure 9:
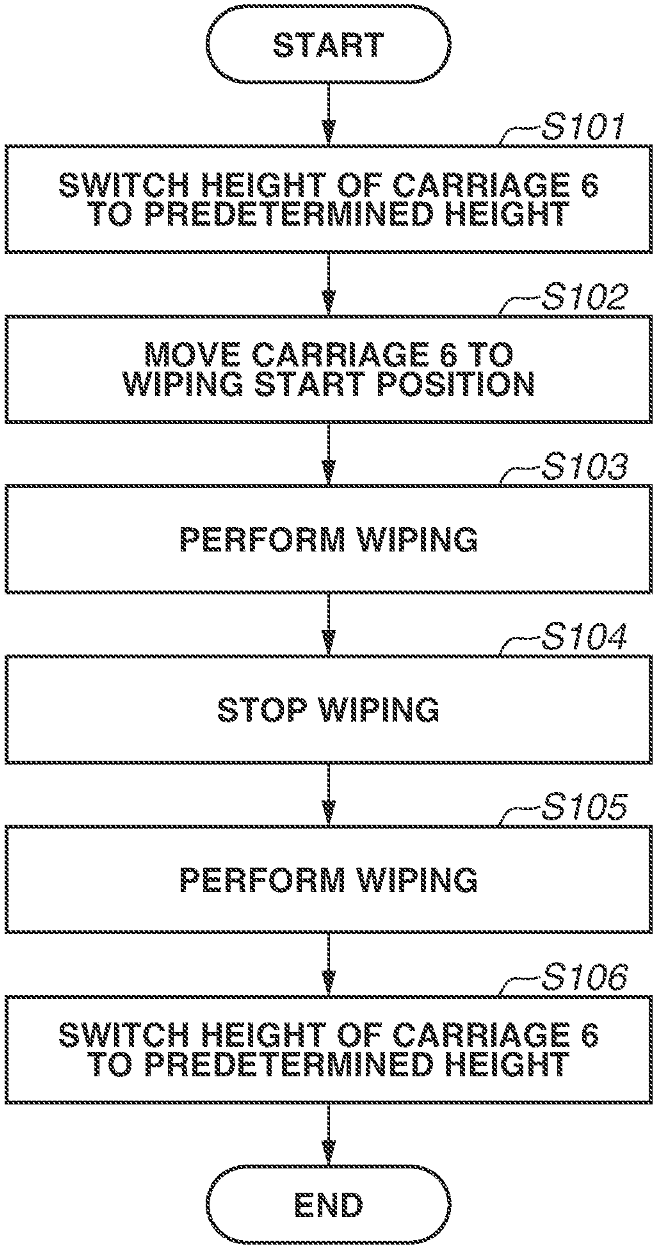
FIG. 9 is a flowchart for a wiping sequence according to the first exemplary embodiment.
Figure 10A:
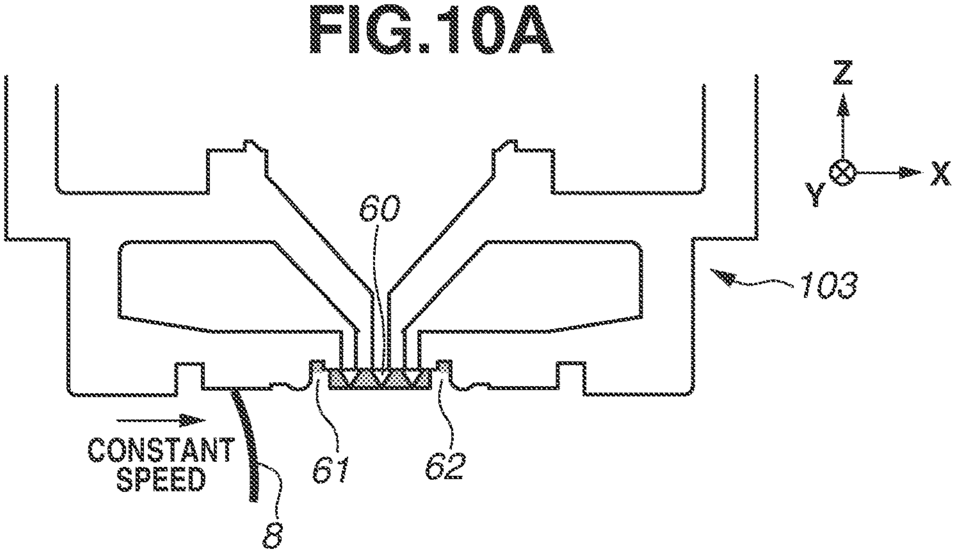
FIGS. 10A to 10C are diagrams each illustrating movement of the recording head and a blade at the time of execution of the wiping sequence according to the first exemplary embodiment.
Figure 10B:
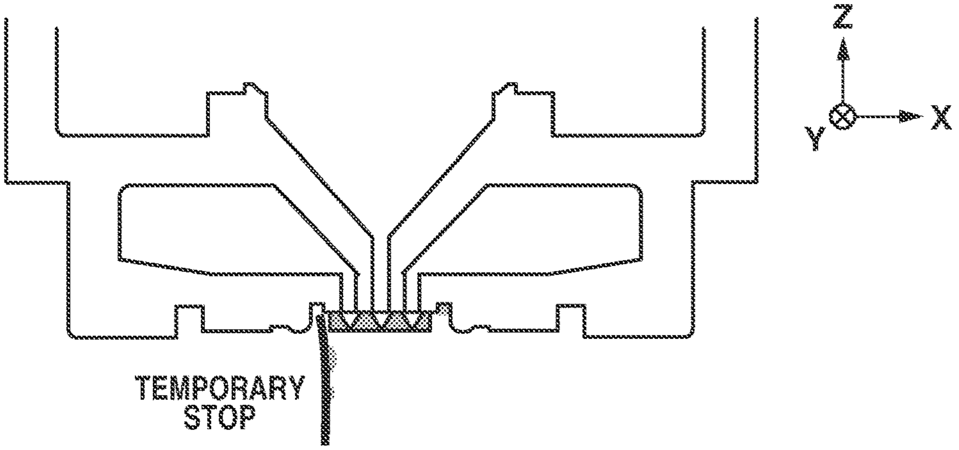
Figure 10C:
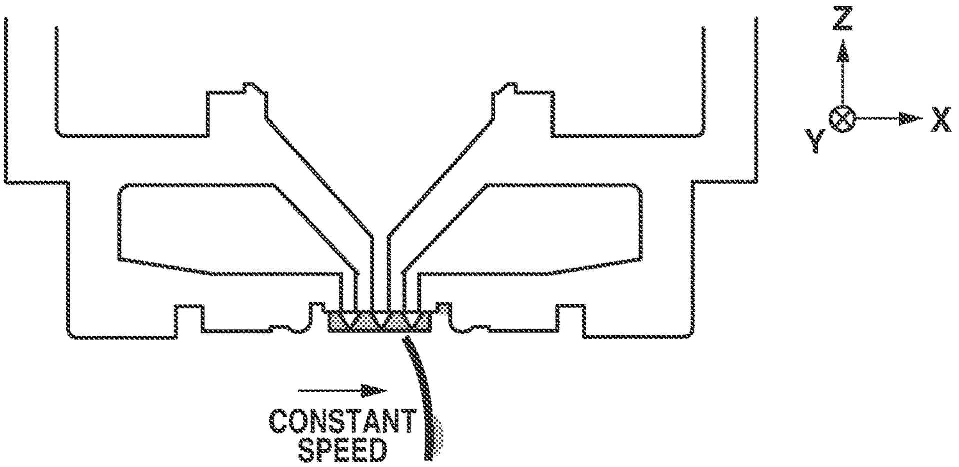

FIG. 9 is a flowchart for the wiping sequence. FIG. 10 is a diagram illustrating a state where the flow in FIG. 9 is executed. In the present exemplary embodiment, after recording for one page is completed, determination is made as to whether an accumulated total number of dots ejected since completion of the latest recovery processing such as suction and wiping is a threshold or more.

In a case where the accumulated total number of dots is the threshold or more, the wiping sequence is executed before the start of recording of the next page. Alternatively, a mode in which the wiping sequence is infallibly executed between pages may be employed. Besides the above, the wiping sequence may be executed after the recording mechanism unit 103 performs recording operation, after the recovery mechanism unit 104 performs suction, before capping is performed, or after uncapping is performed.

The sequence is executed by the MPU 201 controlling each unit in accordance with a program stored in the ROM 202.

First, in step S101, the MPU 201 moves the carriage 6 in the Z-direction so that the recording heads 5A and 5B and the blades 8 and 9 have respective heights that allow the platen facing surface 1031 of the recording head 5A and the platen facing surface 1032 of the recording head 5B to come into contact with the blades 8 and 9, respectively. The movement of the carriage 6 in the Z-direction is performed by driving of the paper feed/conveyance motor 205 and the carriage motor 204. A lever, which is not illustrated, is coupled to the carriage 6 by the paper feed/conveyance motor 205, and driving the carriage motor 204 in a coupled state moves the carriage 6 in the Z-direction. In a case where the height of the carriage 6 at the time of the start of the processing in FIG. 9 is already a height at which the carriage 6 can come into contact with the blades 8 and 9, the processing in step S101 is not performed. The processing in step S101 allows ink on the ejection port surface 51 of the recording head 5A and ink on the ejection port surface 52 of the recording head 5B to be cleaned off by wiping with the blades 8 and 9, respectively.

Subsequently, in step S102, the MPU 201 moves the carriage 6 in the positive X-direction using the carriage motor 204 to the wiping start position at which the blade 8 comes into contact with the platen facing surface 1031. The wiping start position is a position of the carriage 6 when the recovery mechanism unit 104 comes into the state illustrated in FIG. 6A, and this is a state where the platen facing surface 1031 is at a more advanced position in the positive X-direction than a position of the blade 8. In addition, this is also a state where the platen facing surface 1032 is at a more advanced position in the positive X-direction than a position of the blade 9. In step S103, the MPU 201 further moves the carriage 6 in the positive X-direction from the wiping start position (Refer to FIG. 10A). The blades 8 and 9 relatively move in the X-direction while being in contact with the platen facing surfaces 1031 and 1032, respectively, and thereby wipe the ejection port surface 51 of the platen facing surface 1031 and the ejection port surface 52 of the platen facing surface 1032, respectively. Assume that relative speed of the blades 8 and 9 with respect to the carriage 6 at this time is constant speed in the present exemplary embodiment. In step S103, the MPU 201 performs wiping at constant speed from the wiping start position to the first recessed portion 61.

In step S104, when the blades 8 and 9 move to respective positions at or in the vicinity of the first recessed portion 61 and 63, respectively, the MPU 201 stops the relative movement of the blades 8 and 9 and the carriage 6 for 0.2 seconds. With this processing, ink accumulated in the first recessed portions 61 and 63 falls along the blades 8 and 9, respectively, and is removed from the first recessed portions 61 and 63.

The positions in the vicinity of the first recessed portions 61 and 63 are positions that enable extraction of ink accumulated in the first recessed portions 61 and 63 of the respective recording heads 5A and 5B wiped by the blades 8 and 9 when the relative movement is stopped, and fall within, for example, a range of 0.5 mm from the end portion of each of the first recessed portions 61 and 63 in the X-direction. The positions are preferably where leading ends of the blades 8 and 9 enter the inside of the first recessed portions 61 and 63, respectively.

Thereafter, in step S105, the MPU 201 relatively moves the blades 8 and 9 with respect to the carriage 6 at constant speed, and wipes the remaining portions of the platen facing surfaces 1031 and 1032 including the ejection port surfaces 51 and 52, respectively.

Finally, in step S106, the MPU 201 moves the carriage 6 in the Z-direction to have a predetermined height. For example, the MPU 201 moves the carriage 6 to have a height appropriate for the next recording operation. After completion of the above-mentioned steps, the wiping sequence in FIG. 9 ends.

In this manner, temporarily stopping the relative movement of the blades 8 and 9 and the carriage 6 to remove ink accumulated in the first recessed portions 61 and 63, respectively, enables reduction of an amount of ink to be extracted by the blades 8 and 9 from the first recessed portions 61 and 63, respectively, and applied to the ejection port surfaces 51 and 52, respectively.

Time during which the relative movement is stopped in step S104 is 0.2 seconds in the above-mentioned example, but time is not limited thereto. The time can be time during which ink extracted from the first recessed portions 61 and 63 when the blades 8 and 9 wipe the ejection port surfaces 51 and 52, respectively, falls down to portions other than portions where the blades 8 and 9 are in contact with the platen facing surfaces 1031 and 1032, respectively. However, the relative movement is preferably stopped for 0.2 seconds or more.

The relative speed is assumed to be constant speed in steps S103 and 105, but is not limited thereto. The MPU 201 may perform wiping while accelerating or decelerating in a range of such speed as to enable removal of ink on the platen facing surfaces 1031 and 1032.

A second exemplary embodiment is now described. A description of parts similar to those in the first exemplary embodiment will be omitted.

Figure 11:
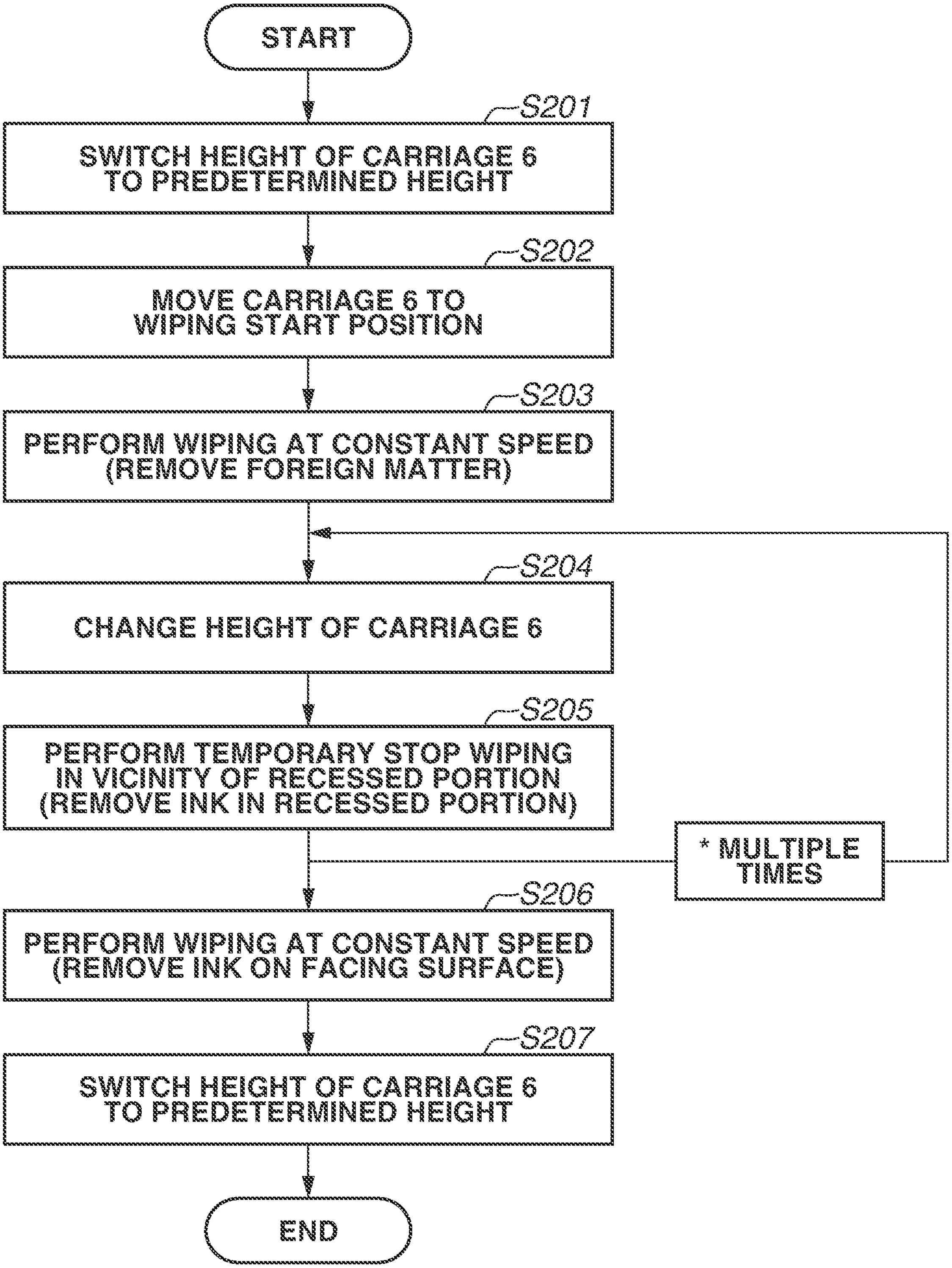
FIG. 11 is a flowchart for a wiping sequence according to a second exemplary embodiment.

FIG. 11 is a diagram illustrating a sequence of wiping operation according to the second exemplary embodiment. Processing in steps S201 to S203 and step S205 to S207 of the flow in FIG. 11 is similar to processing in steps S101 to S103 and steps S104 to S106 in FIG. 9, respectively. In FIG. 11, in step S204, the MPU 201 changes a height of the carriage 6 to change a distance between the ejection port surfaces 51 and 52 and portions of the blades 8 and 9 that come in contact with the ejection port surfaces 51 and 52, respectively, in a direction perpendicular to the ejection port surfaces 51 and 52 (Z-direction) in a state before wiping is performed, and performs the wiping operation multiple times. In this manner, changing contact pressure (wiping pressure) of the blades 8 and 9 to the carriage 6 enables obtaining an effect of increasing ink removing performance.

In addition, the MPU 201 performs temporary stop wiping at or in the vicinity of the first recessed portions 61 and 63 while shifting respective temporary stop positions of the blades 8 and 9 in a wiping direction (X-direction) forward and backward. With this operation, even in a case where a contact position between each of the blades 8 and 9 and the recording head 5 is changed or in a case where a dimension tolerance of each component, an electronic control error, or the like exists, the MPU 201 can temporarily stop the blades 8 and 9 at almost accurate respective positions where the first recessed portions 61 and 63 are. Hence, it is possible to infallibly extract and remove ink accumulated in the first recessed portions 61 and 63.

Performing the wiping operation in accordance with the flow as described above enables more infallible removal of ink from the first recessed portions 61 and 63, and reduction of possibility for application of ink to the ejection port surfaces 51 and 52.

A third exemplary embodiment will now be described. A description of parts similar to those in the above-mentioned exemplary embodiment will be omitted.

In the above-mentioned exemplary embodiments, the description has been given of the configuration in which the blades 8 and 9 stop at respective positions corresponding to the first recessed portions 61 and 63 of the respective recording heads 5A and 5B wiped by the blades 8 and 9, respectively, when the relative movement is stopped.

In the present exemplary embodiment, a description will be given of a case where timings at which the blades 8 and 9 stop at respective positions corresponding to the first recessed portions 61 and 63 are different from each other, and only one of the blades 8 and 9 is stopped one time at or in the vicinity of a corresponding one of the first recessed portions 61 and 63.

FIGS. 12A to 12D are diagrams each illustrating temporary stop positions of a plurality of blades.

Figure 12A:
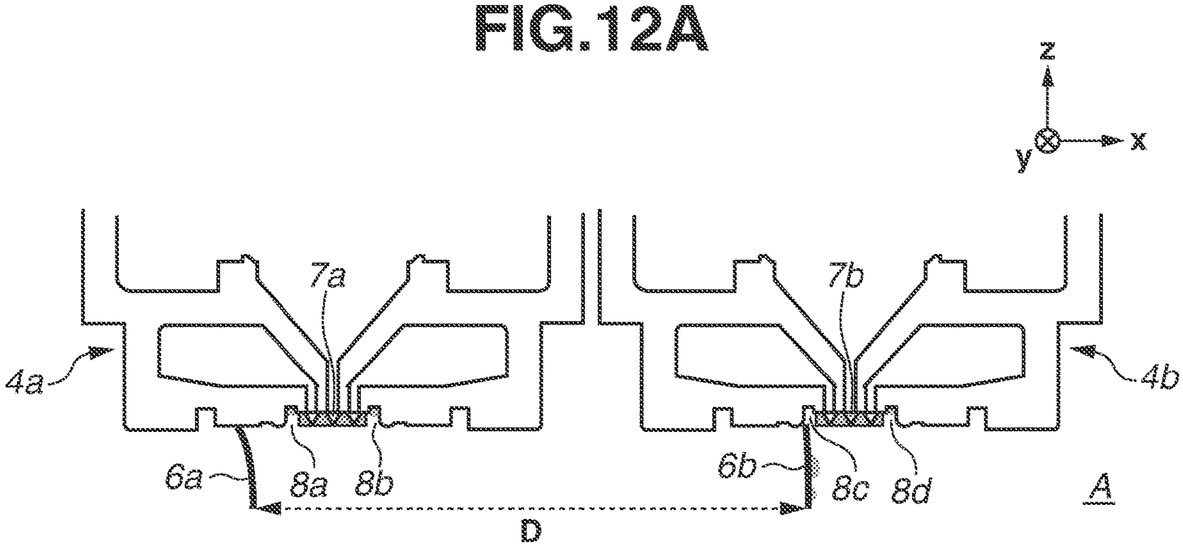
FIGS. 12A and 12B are diagrams each illustrating movement of the recording head and the blade at the time of execution of a wiping sequence according to a third exemplary embodiment.
Figure 12B:
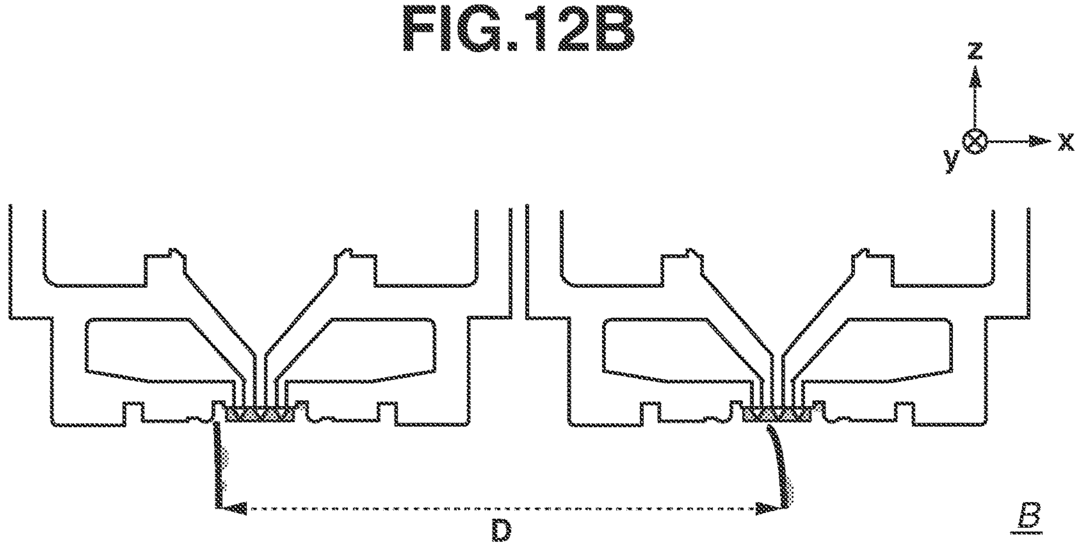

As illustrated in FIG. 12A, when the blade 9 is at a position of the first recessed portion 63 of the recording head 5B, the blade 8 is not at a position corresponding to the first recessed portion 61 of the recording head 5A. As illustrated in FIG. 12B, when the blade 8 is at the position of the first recessed portion 61 of the recording head 5A, the blade 9 is not at the position corresponding to the first recessed portion 63 of the recording head 5B.

In such a configuration, as described in the second exemplary embodiment, stopping the relative movement multiple times enables removal of ink from the first recessed portions 61 and 63 of the respective recording heads 5A and 5B. The third exemplary embodiment is different from the second exemplary embodiment in that a location in which the first recessed portion 61 of the recording head 5A and the blade 8 correspond to each other and a location in which the first recessed portion 63 of the recording head 5B and the blade 9 correspond to each other each serves as a stop position.

The description has been given of the case where the direction in which the first recessed portions 61 and 63 are formed is the Y-direction and the wiping direction of the blade is the X-direction. However, also in a case where the direction in which the first recessed portions 61 and 63 are formed is the X-direction and the wiping direction of the blade is the Y-direction, it is possible to obtain similar effects in the first to third exemplary embodiments.

The description has been given of the case where ink is accumulated in the respective portions that are recessed with respect to the platen facing surfaces 1031 and 1032 in the above-mentioned exemplary embodiments. However, also in a case where there are respective raised portions on the platen facing surfaces 1031 and 1032, ink is similarly accumulated in the raised portions, and thus the configuration can be applied to the above-mentioned exemplary embodiments.

While the above-mentioned exemplary embodiments employ the configuration of performing wiping by stopping the blades 8 and 9 and moving the carriage 6, a configuration of moving the blades 8 and 9 and stopping the carriage 6 may be employed. Alternatively, a configuration of moving both the blades 8 and 9 and the carriage 6 may be employed.

While the above-mentioned exemplary embodiments employ the configuration in which the step portion into which ink enters is formed on each side of the ejection ports 60 in the main scanning direction (X-direction) and wiping is performed by relative movement of the blades 8 and 9 and the carriage 6 in the X-direction, a configuration is not limited thereto. For example, a configuration in which the step portion is formed on each side of the ejection ports 60 in the sub-scanning direction (Y-direction) and wiping is performed by relative movement of the blades 8 and 9 and the carriage 6 in the Y-direction may be employed.

The description has been given of the configuration in which the blades 8 and 9 stop at or in the vicinity of the first recessed portions 61 and 63, respectively. However, the blades 8 and 9 are only required to exist at or in the vicinity of the first recessed portions 61 and 63, respectively, only for time during which ink accumulated in the first recessed portions 61 and 63 is extracted. For this reason, the blades 8 and 9 may be configured to move at or in the vicinity of the first recessed portions 61 and 63, respectively, at low speed. At this time, the speed at which the blades 8 and 9 pass at or in the vicinity of the first recessed portions 61 and 63, respectively, is lower than speed at which the blades 8 and 9 pass the area in which the ejection ports 60 are formed. Wiping the area in which the ejection ports 60 are formed at higher speed enables removal of ink on the ejection port surfaces 51 and 52, and also enables reduction of time required for wiping.

The present exemplary embodiment can prevent ink accumulated in the step portions on the ejection port surfaces 51 and 52 of the respective recording heads 5A and 5B from adhering to the vicinity of the ejection ports 60 at the time of wiping.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-140199, filed Aug. 30, 2021, which is hereby incorporated by reference herein in its entirety.

What is claimed is:

1. A recording apparatus comprising:

a recording head having an ejection port surface and a step portion, wherein an ejection port configured to eject ink is arranged on the ejection port surface and the step portion (i) is at a position different from an area in which the ejection port is arranged on the ejection port surface side and (ii) is formed of at least one of a raised portion that is raised with respect to the ejection port surface or a recessed portion that is recessed with respect to the ejection port surface;

a wiper configured to wipe the ejection port surface; and a moving unit configured to relatively move the wiper and the recording head so that the wiper moves with respect to the recording head in a first direction along the ejection port surface, wherein, in a first wiping, the relative movement of the wiper and the recording head by the moving unit causes the wiper to pass in a vicinity of the step portion at a speed that is lower than a speed at which the wiper wipes the area in which the ejection port is arranged such that ink accumulated in the step portion is removed from the step portion, and wherein, in a second wiping performed after the first wiping, the relative movement of the wiper and the recording head by the moving unit causes the wiper to be past the step portion of the recording head and wipe the recording head in the first direction toward the area in which the ejection port is arranged, and thereafter wipe the area in which the ejection port is arranged.

2. The recording apparatus according to claim 1, wherein the moving unit is configured to relatively move the wiper and the recording head so that the wiper wipes the ejection port surface multiple times.

3. The recording apparatus according to claim 2, further comprising a change unit configured to change a distance, in a direction perpendicular to the ejection port surface, between a portion of the wiper that comes into contact with the ejection port surface and the ejection port surface before the wiper wipes the ejection port surface, wherein the moving unit is configured to relatively move the wiper and the recording head so that the distance between the portion of the wiper that comes into contact with the ejection port surface and the ejection port surface is changed by the change unit and the wiper wipes the ejection port surface multiple times.

4. The recording apparatus according to claim 2, wherein the moving unit is configured to relatively move the wiper and the recording head so that the wiper wipes the ejection port surface multiple times while changing a stop position of the wiper.

5. The recording apparatus according to claim 1, wherein, in the first wiping as part of passing in the vicinity of the step portion, the relative movement of the wiper and the recording head by the moving unit causes the wiper to stop in the vicinity of the step portion at a position sufficient for ink accumulated in the step portion to be removed from the step portion by falling along the wiper.

6. The recording apparatus according to claim 1, wherein, in the first wiping as part of passing in the vicinity of the step portion, the relative movement of the wiper and the recording head by the moving unit causes the wiper to stop in the vicinity of the step portion for an amount of time sufficient for ink accumulated in the step portion to be removed from the step portion by falling along the wiper.

7. The recording apparatus according to claim 6, wherein, in falling along the wiper, ink from the step portion falls down to portions of the wiper other than portions where the wiper is in contact with the ejection port surface.

8. The recording apparatus according to claim 1, wherein the step portion is formed during a process of manufacturing the recording head that includes:

providing the recording head with a chip recessed portion that is larger than a chip provided with the ejection port, and attaching the chip provided with the ejection port in the chip recessed portion to form a gap that serves as the step portion having a possibility for entry of ink into the step portion.

9. A wiping method for a recording apparatus, wherein the recording apparatus includes a recording head having an ejection port surface and a step portion, wherein an ejection port configured to eject ink is arranged on the ejection port surface and the step portion (i) is at a position different from an area in which the ejection port is arranged on the ejection port surface side and (ii) is formed of at least one of a raised portion that is raised with respect to the ejection port surface or a recessed portion that is recessed with respect to the ejection port surface, wherein the recording apparatus further includes a wiper configured to wipe the ejection port surface, and a moving unit, the method comprising:

relatively moving the wiper and the recording head via the moving unit so that the wiper moves with respect to the recording head in a first direction along the ejection port surface;

causing, in a first wiping by the relative movement of the wiper and the recording head by the moving unit, the wiper to pass in a vicinity of the step portion at a speed that is lower than a speed at which the wiper wipes the area in which the ejection port is arranged such that ink accumulated in the step portion is removed from the step portion; and causing, in a second wiping, performed after the first wiping, by the relative movement of the wiper and the recording head by the moving unit, the wiper to be past the step portion of the recording head and wipe the recording head in the first direction toward the area in which the ejection port is arranged, and thereafter wipe the area in which the ejection port is arranged.

10. A recording apparatus comprising:

a recording head having an ejection port surface and a step portion, wherein an ejection port configured to eject ink is arranged on the ejection port surface and the step portion (i) is at a position different from an area in which the ejection port is arranged on the ejection port surface side and (ii) is formed of at least one of a raised portion that is raised with respect to the ejection port surface or a recessed portion that is recessed with respect to the ejection port surface;

a wiper configured to wipe the ejection port surface; and a moving unit configured to relatively move the wiper and the recording head so that the wiper moves with respect to the recording head in a first direction along the ejection port surface, wherein, in a first wiping to reduce ink accumulated in the step portion, the wiper is moved to an accumulated ink removal position and a velocity of the wiper is changed during the move to the accumulated ink removal position so that, on the wiper reaching the accumulated ink removal position, ink accumulated in the step portion has access to the wiper and time during that access that is sufficient to be extracted from the step portion and fall along the wiper to be removed from the step portion, and wherein, in a second wiping performed after the first wiping, the relative movement of the wiper and the recording head by the moving unit causes the wiper to be past the step portion of the recording head and wipe the recording head in the first direction toward the area in which the ejection port is arranged, and thereafter wipe the area in which the ejection port is arranged.

* * * * *